(12) United States Patent (10) Patent No.: US 8,584,096 B2
Schnabele et al. (45) Date of Patent: *Nov. 12, 2013

(54) CHANGE MANAGEMENT METHODOLOGIES FOR INDUSTRIAL AUTOMATION AND INFORMATION SYSTEMS

(75) Inventors: Werner Schnabele, Landau (DE); Günter Friedrich Schunck, Annweiler (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/274,989

(22) Filed: Oct. 17, 2011
(Under 37 CFR 1.47)

(65) Prior Publication Data
US 2012/0036500 A1 Feb. 9, 2012

Related U.S. Application Data

(63) Continuation of application No. 11/750,167, filed on May 17, 2007, now Pat. No. 8,065,666.

(60) Provisional application No. 60/803,853, filed on Jun. 2, 2006.

(51) Int. Cl.
*G06F 9/44* (2006.01)

(52) U.S. Cl.
USPC .............................. 717/128; 717/125; 717/127

(58) Field of Classification Search
USPC .................................. 717/149, 125–132, 151
See application file for complete search history.

(56) References Cited

U.S. PATENT DOCUMENTS

| | | | |
|---|---|---|---|
| 5,442,344 A | 8/1995 | Merkle et al. | |
| 5,742,823 A * | 4/1998 | Edwards et al. | 718/102 |
| 5,754,861 A * | 5/1998 | Kumar | 717/128 |
| 5,832,458 A | 11/1998 | Jones | |
| 6,550,057 B1 | 4/2003 | Bowman-Amuah | |
| 6,704,806 B1 * | 3/2004 | Decker | 719/324 |
| 6,775,827 B1 * | 8/2004 | Harkins | 717/130 |
| 6,931,573 B2 * | 8/2005 | Adams et al. | 714/38.1 |
| 6,954,924 B2 * | 10/2005 | Degenaro et al. | 717/131 |
| 6,964,040 B2 * | 11/2005 | Osborn | 717/151 |
| 6,983,317 B1 * | 1/2006 | Bishop et al. | 709/223 |
| 7,024,548 B1 | 4/2006 | O'Toole | |

(Continued)

OTHER PUBLICATIONS

Burns et al, "Verifiable Audit Trails for a Versioning File System" ACM, pp. 44-50, 2005.*

(Continued)

*Primary Examiner* — Anil Khatri
(74) *Attorney, Agent, or Firm* — Turocy & Watson, LLP; Alexander R. Kuszewksi; John M. Miller

(57) ABSTRACT

Systems and methods that facilitate electronic audit recording and tracking of interactions in an industrial control system via employing a differentiation engine that supplies an object-oriented presentation of an audit trail—and further present a view of a desired segment associated with a PLC program (e.g., a particular run of the PLC program), for an object that an audit is requested for. A user (e.g., a customer of the industrial process) can initially identify an object and subsequently view typically all changes to such identified object. Accordingly, a general requirement for checking every version to determine a change to the object is mitigated.

14 Claims, 8 Drawing Sheets

(56) References Cited

U.S. PATENT DOCUMENTS

| | | | |
|---|---|---|---|
| 7,123,974 B1 | 10/2006 | Hamilton | |
| 7,146,603 B2 | 12/2006 | Kerpan et al. | |
| 7,185,319 B2* | 2/2007 | Kaler et al. | 717/124 |
| 7,225,432 B2* | 5/2007 | Jentsch et al. | 717/129 |
| 7,225,433 B2* | 5/2007 | Jentsch et al. | 717/129 |
| 7,246,156 B2 | 7/2007 | Ginter et al. | |
| 7,451,350 B2 | 11/2008 | Cherny et al. | |
| 7,451,435 B2 | 11/2008 | Hunt et al. | |
| 7,457,515 B1* | 11/2008 | Faria | 386/326 |
| 7,457,832 B2 | 11/2008 | Baird et al. | |
| 7,506,318 B1 | 3/2009 | Lindo et al. | |
| 7,536,679 B1* | 5/2009 | O'Connell et al. | 717/126 |
| 7,559,053 B2* | 7/2009 | Krassovsky et al. | 717/126 |
| 7,603,659 B2* | 10/2009 | Blumenthal et al. | 717/128 |
| 7,761,854 B2 | 7/2010 | Hack | |
| 7,779,119 B2 | 8/2010 | Ginter et al. | |
| 7,810,075 B2* | 10/2010 | Dostert et al. | 717/128 |
| 7,900,198 B2 | 3/2011 | Kasman | |
| 7,957,497 B2 | 6/2011 | Bae | |
| 8,146,060 B2* | 3/2012 | Lekel | 717/125 |
| 8,191,047 B2* | 5/2012 | Weiss | 717/126 |

OTHER PUBLICATIONS

Lieberknecht et al, "A Dataset and Evaluation Methodology for Template-based Tracking Algorithms", IEEE, pp. 145-151, 2009.*

Jovalekic et al, "Test Automation of Distributed Embedded Systems Based on Test Object Structure Information", IEEE, pp. 343-347, 2008.*

Fu et al, "Inferring Types of References to GUI Objects in Test Scripts", IEEE, pp. 1-10, 2009.*

Cloutier, et al., "Applying object oriented systems engineering to complex systems", IEEE, pp. 1-6, 2008.

Sun, et al., "Behavior based audit modeling of application system", IEEE, 168-171, 2011.

Hai, et al., "Unified modeling of complex real time control systems", ACM Date, pp. 1-2, 2005.

Xianlin, et al., Study on and development of the information system for digital quality audit and control, IEEE, pp. 1-4, 2009.

* cited by examiner

CHANGE MANAGEMENT METHODOLOGIES FOR INDUSTRIAL AUTOMATION AND INFORMATION SYSTEMS

CROSS REFERENCE TO RELATED APPLICATIONS

This application is a continuation of U.S. application Ser. No. 11/750,167, filed on May 17, 2007, entitled "CHANGE MANAGEMENT METHODOLOGIES FOR INDUSTRIAL AUTOMATION AND INFORMATION SYSTEMS," which claims priority from U.S. Provisional Application No. 60/803,853, filed on Jun. 2, 2006. The entireties of each of the foregoing applications are incorporated herein by reference.

TECHNICAL FIELD

The subject invention relates generally to management of industrial systems, and more particularly to methodologies for software interaction (e.g., automatic upload or comparison of applications) that are typically employed in industrial plant models.

BACKGROUND

Advancements in technology have enabled factory applications to become partially or completely automated. For example, applications that once required workers to place themselves proximate to heavy machinery and other various hazardous conditions, can now be completed at a safe distance from such hazards. Furthermore, imperfections associated with human action have been minimized through employment of highly precise machines. Many of such factory devices supply manufacturing data to databases that are accessible by system/process/project managers on a factory floor. For instance, sensors can detect a number of times a particular machine has completed an operation given a set amount of time, and can deliver data to a processing unit relating to system alarms. Thus, a factory automation system can review collected data and automatically and/or semi-automatically schedule maintenance of a device, replacement of a device, and other maintenance procedures.

In such settings, various units and controllers can execute control programs, softwares or routines, to measure process variables or inputs that represent state of controlled processes and/or effectuate outputs associated with control of such process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium. Various control modules can also be spatially distributed along a common communication link in several locations. Data can be communicated with these remote modules over a common communication link, or network, wherein any or all modules on the network communicate via a common and/or an industrial communications protocol. Moreover, units within an industrial system can communicate with each other, with software modules residing therein, or in other control systems and/or with systems and/or applications outside of a control environment (e.g., business related systems and applications), for example.

Effective management is an important objective for industrial system operations, wherein choosing an appropriate development lifecycle process for the software implementation becomes crucial. For example, various activities in an industrial process can be derived from such lifecycle process. At the same time, continuously changing design or specification requirements of the development cycle poses difficulties and major problems. For example, searching for the current program version, changes between versions or investigating the reasons for such changes (when, why and by whom) can add up to significant overhead and increase risk of operation.

Typically, for such lifecycle of software in industrial plants it is important to gather and agree on design/processing requirements are fundamental to a successful implementation. Such does not necessarily imply that all requirements need to be fixed before any implementation design, or coding among various processes is done—yet it is important for the industrial processes to implement what actually needs to be performed at each stage. The cyclical interaction among various units/controllers for reaching desired processing outcome can become a complex process, wherein the division of tasks and activities are carried out by generating documents/items that need to be timely shared among the various units at various stages of the processes. In particular, during operation it can become difficult to identify what is the proper version of the software and/or product requirement that should drive the design process. Accordingly, the units/teams involved can squander resources to determine a proper state such as a proper version of a software to be employed. Without a proper and unique source for software and/or documentation identification, confusion and misunderstandings occur that can lead to lost productivity, and poor customer experience.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates electronic audit recording and tracking of interactions in an industrial control system via employing a differentiation engine (e.g., a software engine) that supplies an object-oriented presentation of an audit trail (e.g., identifies version changes of PLC programs and objects during various runs). Such differentiation engine can further interact with a view selection component that present a view of a desired segment associated with a PLC program (e.g., a particular run of the PLC program), for an object that an audit is requested for. A user (e.g., a customer of the industrial process) can initially identify an object and subsequently view typically all changes to such identified object. Accordingly, a general requirement for checking every version (e.g., from version 1 to version 2 to version 3, and the like) to determine a change to the object is mitigated, and hence a user can readily view a version that a particular object/run was modified therein.

In a related aspect, the differentiation engine can further include a real time recording component that interacts with an application/PLC run. For example, when the application logs on or communicates to a respective control system component, the recording component typically records all interactions (or controlled subset of interactions) with the control system during a current session. The respective interactions or changes are provided to a tracking component that stores such interactions in a database record of the control system that is being accessed. Upon demand (or occurrence of a predetermined event), the tracking component can generate electronic auditing information for the control system by retrieving the previous recordings that have been collected, aggregated, or stored for such interactions.

According to a further aspect, the differentiation engine of the subject innovation can in part supply the object oriented presentation for the audit by employing a packaging component that receives data from a data source, such as a programmable logic controller or other industrial unit. Next, received data can be encapsulated to expose properties and methods of such data, to rendering these properties and methods as data object(s), thus facilitating an object oriented presentation for an audit trail. Upon formatting the data as one or more data object(s), a data-consuming device within an industrial automation environment can employ an interface to access a data object that a user desires to monitor.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

Figure 1:
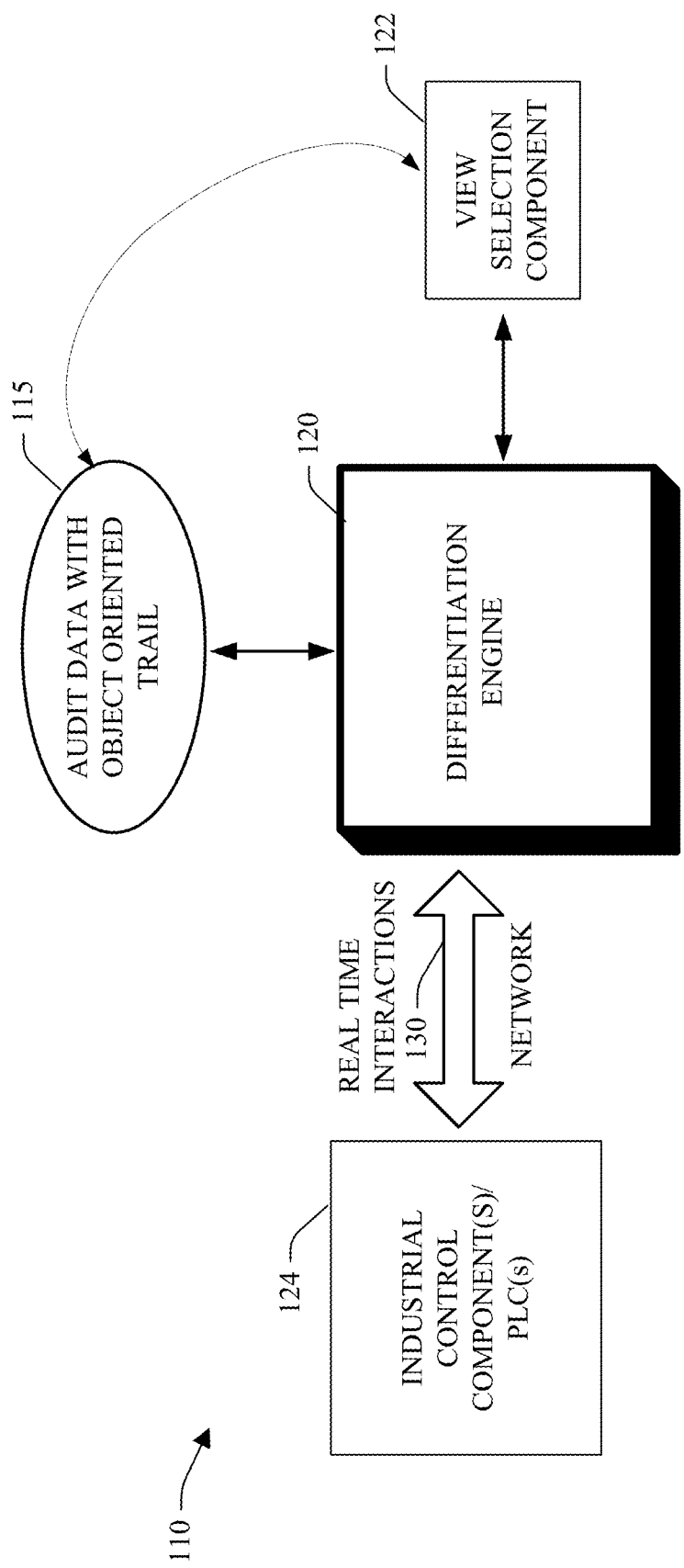
FIG. 1 is a high-level block diagram of a differentiation engine that facilitates object-oriented presentation of an audit trail, in accordance with an aspect of the subject innovation.

Appendix A is a list of features for a differentiation engine in connection with particular aspects of the subject innovation, and this appendix is considered part of the detailed description of this application.

DETAILED DESCRIPTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," "unit", "controller" "engine" and the like are intended to refer to a computer-related entity, either hardware, a combination of hardware and software, software, or software in execution, and/or electromechanical equipment, circuitry and electronics. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an object oriented audit trail for an industrial control environment in accordance with an aspect of the subject innovation. A differentiation engine 120 supplies an object-oriented presentation of a report for an audit trail 115 (e.g., version changes of PLC programs and objects during various runs), which can be viewable by a user. Such differentiation engine 120 can be associated with a view selection component 122 that supplies a view of a desired segment for a PLC program (e.g., a particular run of the PLC program), related to an object that an audit is requested for. A user (e.g., a customer of the industrial process) can initially identify an object and subsequently view typically all changes to such identified object in an audit report. Accordingly, a general requirement for checking every version (e.g., from version 1 to version 2 to version 3, and the like) to determine a change to the object is mitigated, and hence a user can readily view a version that a particular object/run was modified therein. The view selection component 122 can include a data system user interface (UI) that can provide different data renderers (e.g., views) based on an attribute of the content of a view-set (e.g., list, folder, directory, search result, and the like). Moreover, views that are suitable to present certain types of content, such as changes for a desired object in various versions of a PLC control program can be automatically selected.

The differentiator engine 120 interacts with one or more industrial control components 124 via a network 130. Such differentiator engine 120 can include substantially any type of hardware and/or software (e.g., editing tool, programming tool, communications component, and monitoring component) that can interact with the industrial control components 124. The industrial control component 124 can itself include programmable logic controllers (PLCs), communications modules and/or I/O modules, and the connecting network 130 can employ local factory networks (e.g., Ethernet, Control-Net, DeviceNet) and/or public networks such as the Internet, for example.

Figure 2:
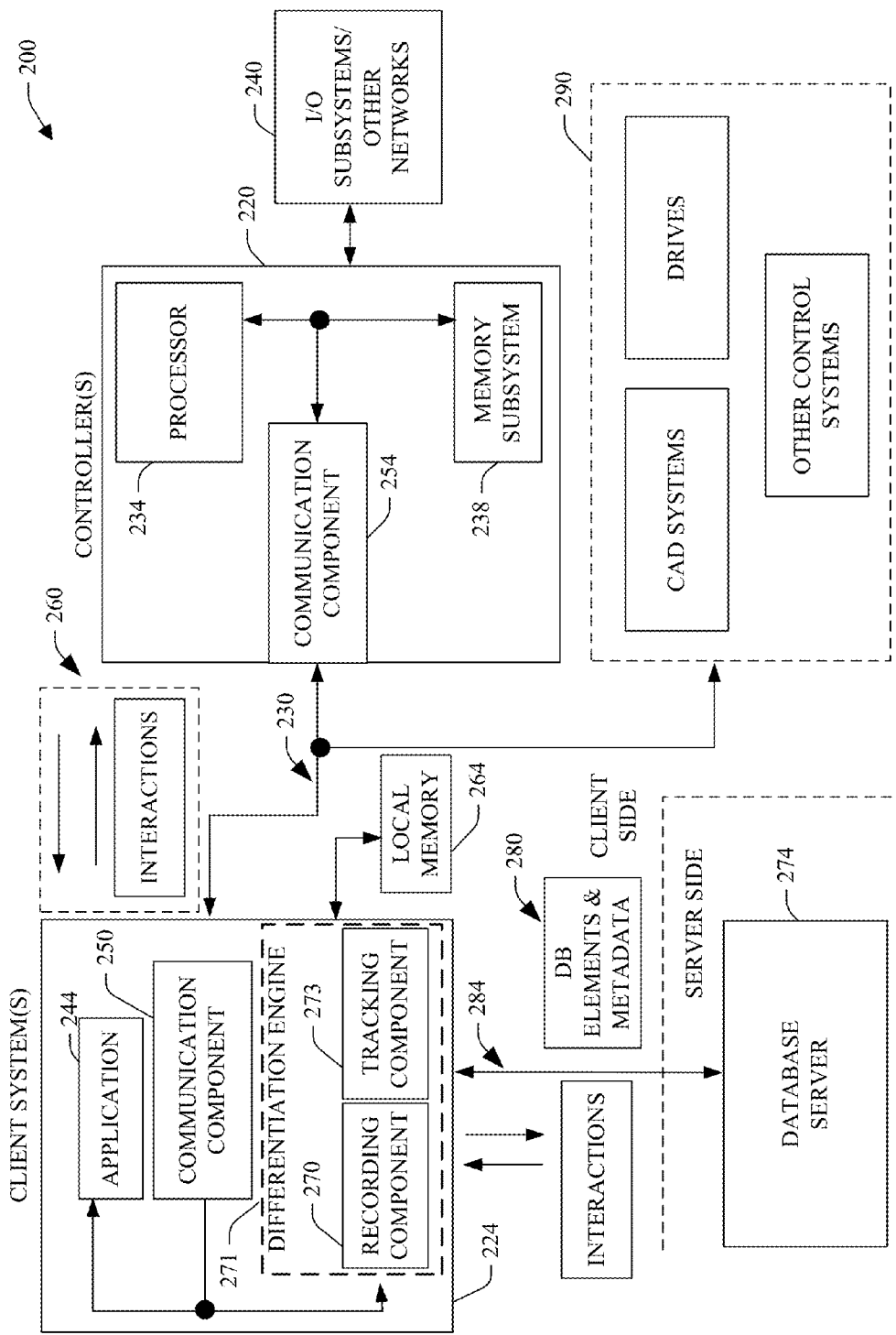
FIG. 2 is a further block diagram of a differentiation engine as part of an industrial setting in accordance with an aspect of the subject invention.

Referring now to FIG. 2, an exemplary industrial control and audit/tracking system with a differentiation engine 271 that can supply an object oriented audit trail is illustrated in accordance with a particular aspect of the subject innovation. The system 200 includes an industrial controller 220 communicating to one or more client systems 224 across a local factory network (e.g., DeviceNet, ControlNet, Ethernet, DH+, Intranet) and/or a public network 230 such as the Internet. This can also include other communications options such as phone connections and/or wireless interactions. A processor 234 (or processors) in the controller 220 executes from an associated memory subsystem 238 that can include an operating system (e.g., Microsoft® Windows® NT/2000/XP, Windows CE™, Linux™, .NET™, OS-9™, UNIX™, VRTX™, QNX™, VxWorks™, CE.NET™, custom-designed). The controller 220 can also communicate to and control various Input/Output subsystems 240 and/or other networks (e.g., Analog, Digital, Programmed/Intelligent I/0 modules, other programmable controllers, communications modules, networks).

The client system 224 includes at least one application 244 that interacts with a client communications component 250 to exchange data with the controller 220 via a communications component 254 suitably adapted to transfer information on the network 230. As illustrated, one or more interactions 260 can be monitored (e.g., data sent or received) to/from the controller 220 (or other control components, databases) in response to instructions or commands executed by the application 244. The application 244 can include substantially any type of software for manipulating the interactions 260 such as an editor tool or other applications, wherein the interactions 260 are generally processed on a local memory or storage device 264. Such can include interactions as creating, viewing and/or modifying controller programs or memory that are generally a by-product of the interactions 260. The differentiation engine 271 mitigates a general requirement for checking every version (e.g., from version 1 to version 2 to version 3, and the like) to determine a change to a desired object, and hence a user can readily view a version that a particular object/run was modified therein.

As illustrated in FIG. 2, a recording component 270 and a tracking component 273 can be provided as part of the differentiation engine 271. The recording component 270 can log interactions or activities that have been directed to the industrial control components/controllers 220 during a current application session associated with the differentiation engine 271. Examples of data that can be logged include: access dates, access times, applications that have attempted access, user names, online/offline status, when the applications have started and stopped, what other files were invoked, opened, or saved by the application, and/or the type of access being directed to the industrial control components—such as forcing or changing memory program elements, logic program changes, status changes such as run/program mode changes, memory alterations and so forth. In general, substantially any remote/local interaction with the industrial control components 220 is logged by the recording component during the current application session of the differentiation engine in a substantially real time manner. The tracking component 273 can aggregate activities logged by the recording component in a local storage or cache 264 and/or in a remote storage location, such as a database server 274. The tracking component aggregates transaction data by creating a file, schema, and/or data structure (not shown) in the local or remote storage, and tags the file with an identifier relating to the industrial control component 220 that has been accessed.

As respective industrial control components 220 are accessed, the tracking component 273 stores the information collected by the recording component 270 in the file marked for the component so accessed. During an audit procedure (e.g., automated report request generated from a user interface or as scheduled from a maintenance application), the tracking component 273 can automatically access the local and/or remote storage 274 and 264, retrieve one or more tagged files and generate, transmit, display and/or report the files for subsequent auditing and tracking procedures (e.g., generate audit report of system activities during specified period for regulated industry requirements). The files or data can be automatically provided in an audit data and report with object oriented trail. Such can contain the activities that have been logged for a particular object identified by a user and supply version changes of PLC programs and objects during various runs.

It is to be appreciated that transactions with the server database 274 can also be recorded as interactions even though the transactions may not affect the controller 220 (e.g., record that a program was uploaded to the client 224, modified, and saved on the database 274 even though program was never downloaded to controller 220). The data relating to the interactions 260 can be stored as database elements 280 (e.g., SQL elements, XML schema, data structures) describing controller interactions and associated activities affecting the controller and/or other industrial control components. In addition, metadata can be associated with the database elements 280 that describe supervisory aspects of the present invention in order that database manipulation activities are recorded for control and security purposes. Before the database elements 280 can be retrieved from the database server 274 (or stored therein), a login and authentication procedure may be performed via the recording component 270 and tracking component 273 (or other application) to determine if a respective user of the application 244 has the authority to access such data.

A user (e.g., a customer of the industrial process) can initially identify an object and subsequently view typically all changes to such identified object. Accordingly, a general requirement for checking every version (e.g., from version 1 to version 2 to version 3, and the like) to determine a change to the object is mitigated, and hence a user can readily view a version that a particular object/run was modified therein. Moreover, If the user has logged-on successfully (e.g., entered a suitable pass-phrase) and been authenticated to view audit reports and changes, the user can also perform a check-out operation to retrieve one or more desired database files from the database 274 as a working file (not shown) in the local memory 264. The user can then perform operations such as edits to the working file on the client system 224 (and local memory 264) via associated application 244 and can download the working file to the controller 220 for other testing or program operations, if desired. As can be appreciated, all activities such as uploading files from the database server 274, manipulating such files, downloading/uploading images, and/or manipulating elements within the controller 220 are recorded by the recoding and tracking component 270, wherein such activities or interactions are stored as the database elements 280 to preserve audit information about control system changes that may have occurred in the system 200.

It is noted that the recording 270 and tracking component 273 can act as an intermediary component between the application 244 and the database 274. As such, a separate communications network 284 (or software channel/socket) can exist between the recording component 270 and tracking component 273 and database 274, if desired. In another aspect, the recording component 270 and tracking component 273 can communicate through the client communications component 250 and network 230 to transfer information to and from the database 274. In addition, the recording component 270 and tracking component 273 can be provided as a re-locatable object wherein the object is operated on various or different platforms/applications to monitor industrial control activities and achieve access to the database 274. As one example, the recording component 270 and tracking component 273 can be located and/or operated in the memory subsystem 238 of the controller 220.

In another aspect of the subject innovation, the interactions 260 can be generated by and/or operated upon via one or more auxiliary control systems or control support systems illustrated at reference numeral 290. For example, the systems at 290 which can also have interactions 260 stored and retrieved from the database 274 include CAD systems, drives, and/or other control systems such as robotic systems or advanced manufacturing cells.

Figure 3:
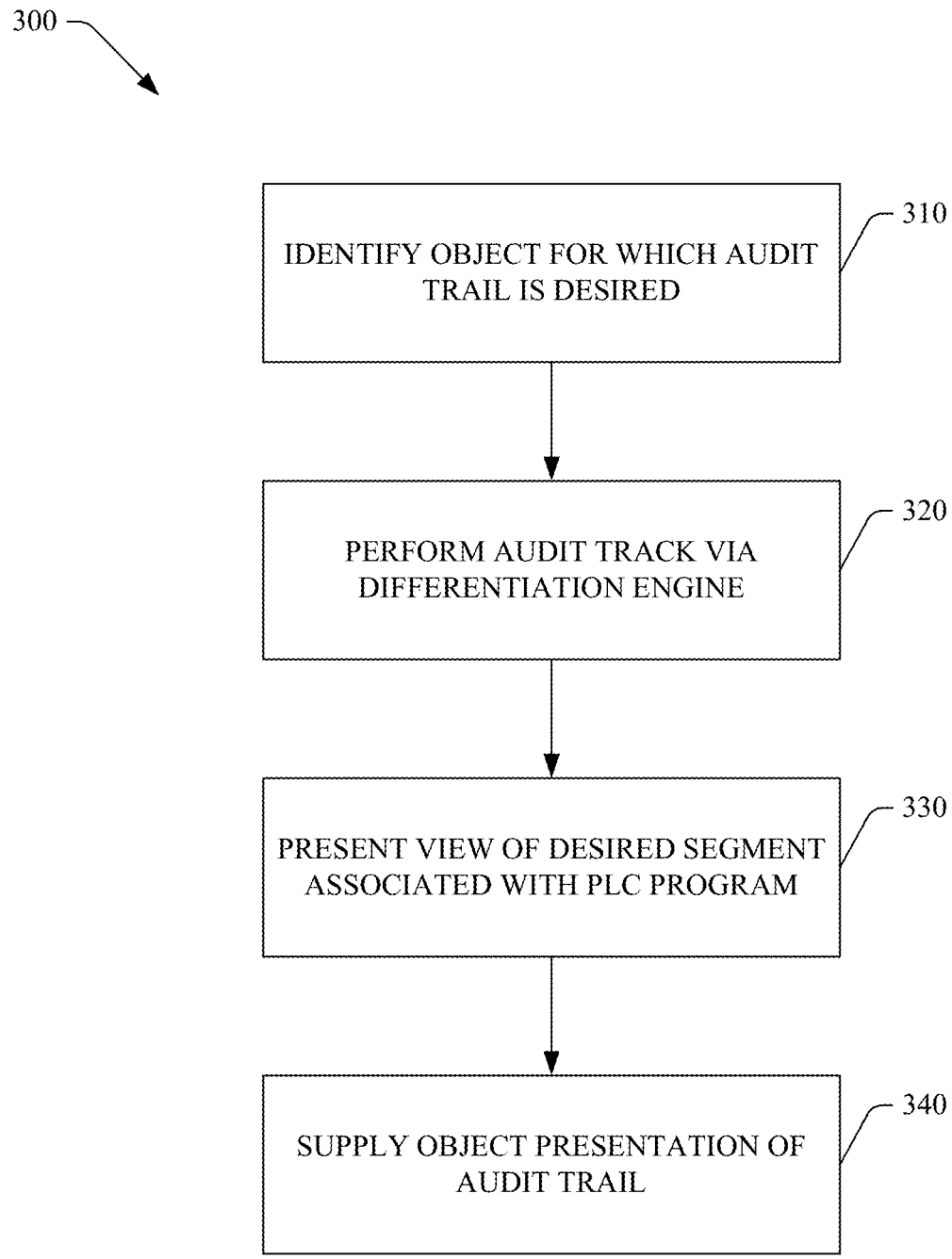
FIG. 3 illustrates a methodology for object-oriented representation of an audit trail in accordance with an aspect of the subject innovation.

FIG. 3 illustrates a methodology 300 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 310 a user (e.g., a customer of the industrial process) can initially identify an object for which an audit trail is desired. Subsequently, and at 320 the differentiation engine of the subject innovation can perform an audit track for such identified object. At 330, the differentiation engine can present a view of a desired segment associated with a PLC program (e.g., a particular run of the PLC program), for the object that an audit is requested for. Next and 340, the differentiation engine can supply an object-oriented presentation of such audit trail. Accordingly, a general requirement for checking every version (e.g., from version 1 to version 2 to version 3, and the like) to determine a change to the object is mitigated, and hence a user can readily view a version that a particular object/run was modified therein.

Figure 4:
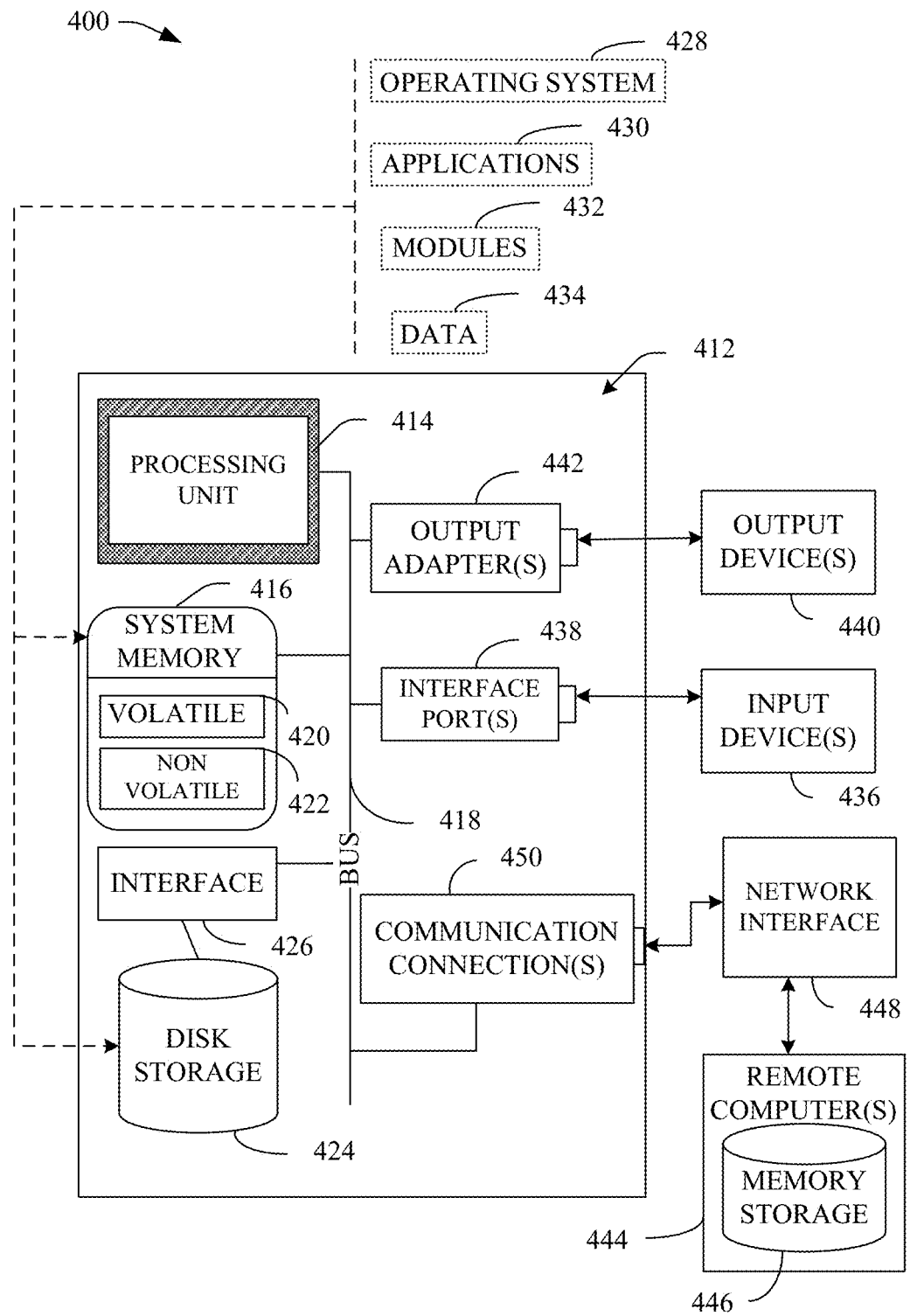
FIG. 4 illustrates an exemplary computing environment for the differentiation engine and/or various controller units, in accordance with an aspect of the subject innovation.

With reference to FIG. 4, an exemplary environment 400 for implementing various aspects of the invention that includes a computer 412 is depicted. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 416 includes volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable ROM (EEPROM), or flash memory. Volatile memory 420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 412 also includes removable/non-removable, volatile/non-volatile computer storage media. FIG. 4 illustrates, for example a disk storage 424. Disk storage 424 includes, but is not limited to, devices like a magnetic disk drive, floppy disk drive, tape drive, Jaz drive, Zip drive, LS-100 drive, flash memory card, or memory stick. In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in suitable operating environment 400. Such software includes an operating system 428. Operating system 428, which can be stored on disk storage 424, acts to control and allocate resources of the computer system 412. System applications 430 take advantage of the management of resources by operating system 428 through program modules 432 and program data 434 stored either in system memory 416 or on disk storage 424. It is to be appreciated that the subject invention can be implemented with various operating systems or combinations of operating systems.

A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB). Output device(s) 440 use some of the same type of ports as input device(s) 436. Thus, for example, a USB port can be used to provide input to computer 412, and to output information from computer 412 to an output device 440. Output adapter 442 is provided to illustrate that there are some output devices 440 like monitors, speakers, and printers, among other output devices 440, which require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a personal computer, a server, a router, a network PC, a workstation, a microprocessor based appliance, a peer device or other common network node and the like, and typically includes many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to computer 412. The hardware/software necessary for connection to the network interface 448 includes, for exemplary purposes only, internal and external technologies such as, modems including regular telephone grade modems, cable modems and DSL modems, ISDN adapters, and Ethernet cards.

Figure 5:
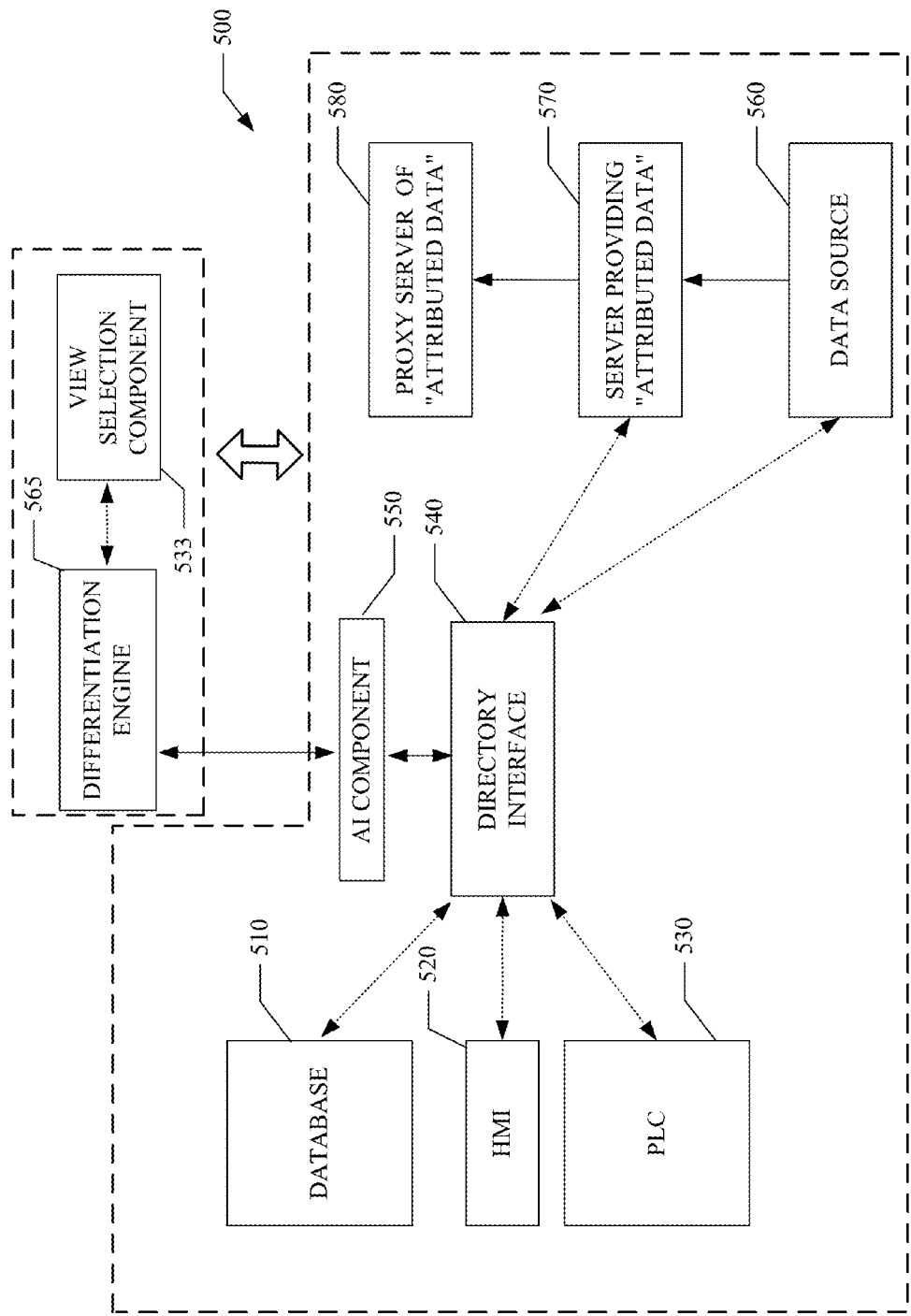
FIG. 5 illustrates an exemplary industrial automation network that employs electronic audit recording and tracking of interactions in an industrial control system in accordance with an aspect of the subject innovation.

FIG. 5 illustrates an exemplary industrial automation network that employs electronic audit recording and tracking of interactions in an industrial control system 500 in accordance with an aspect of the subject innovation. The differentiation engine 565 can supply an object-oriented presentation of an audit trail such as identifying version changes of PLC programs associated with the PLC 530 and/or objects during various runs.

The industrial setting 500 can include a database 510, a human machine interface (HMI) 520 and a programmable logic controller (PLC) 530, and a directory interface 540. The directory interface 540 can further associate with an Artificial Intelligence (AI) component 550 to facilitate efficient audit trailing of desired data within a particular network/application. The directory interface 540 can be employed to provide data from an appropriate location such as the data source 560, a server 570 and/or a proxy server 580. Accordingly, the directory interface 540 can point to a source of data based upon role and requirements (needs) of a requester (e.g., database 510, HMI 520, PLC 530, and the like.) The database 510 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 540 can provide data to the database 510 from the server 570, which provides data with the attributes desired by the database 510.

Moreover, the differentiation engine 565 can further interact with a view selection component 533 that present a view of a desired segment associated with a PLC program (e.g., a particular run of the PLC program), for an object that an audit is requested for. The view selection component 533 can further interact with an HMI interface 520, wherein a user (e.g., a customer of the industrial process) can initially identify an object and subsequently view typically all changes to such identified object. Accordingly, a general requirement for checking every version (e.g., from version 1 to version 2 to version 3, and the like) to determine a change to the object is mitigated, and hence a user can readily view a version that a particular object/run was modified therein.

Moreover, the HMI 520 can employ the directory interface 540 to point to data located within the system 500. The HMI 520 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 520 can request data to have particular visualization attributes associated with data in order to easily display such data thereto. For example, the HMI 520 can query the directory interface 540 for a particular data point that has associated visualization attributes. The directory interface 540 can determine the proxy server 580 contains the attributed data point with the desired visualization attributes. For instance, the attributed data point can have a particular graphic that is either referenced or sent along with the data such that this graphic appears within the HMI environment instead of or along with the data value.

The PLC 530 can be any number of models such as Allen Bradley PLC5, SLC-500, MicoLogix, and the like. The PLC 530 is generally defined as a specialized device employed to provide high-speed, low-level control of a process and/or system. The PLC 530 can be programmed using ladder logic or some form of structured language. Typically, the PLC 530 can utilize data directly from a data source (e.g., data source 560) that can be a sensor, encoder, measurement sensor, switch, valve and the like. The data source 560 can provide data to a register in a PLC and such data can be stored in the PLC if desired. Additionally, data can be updated (e.g., based on a clock cycle) and/or output to other devices for further processing.

Figure 6:
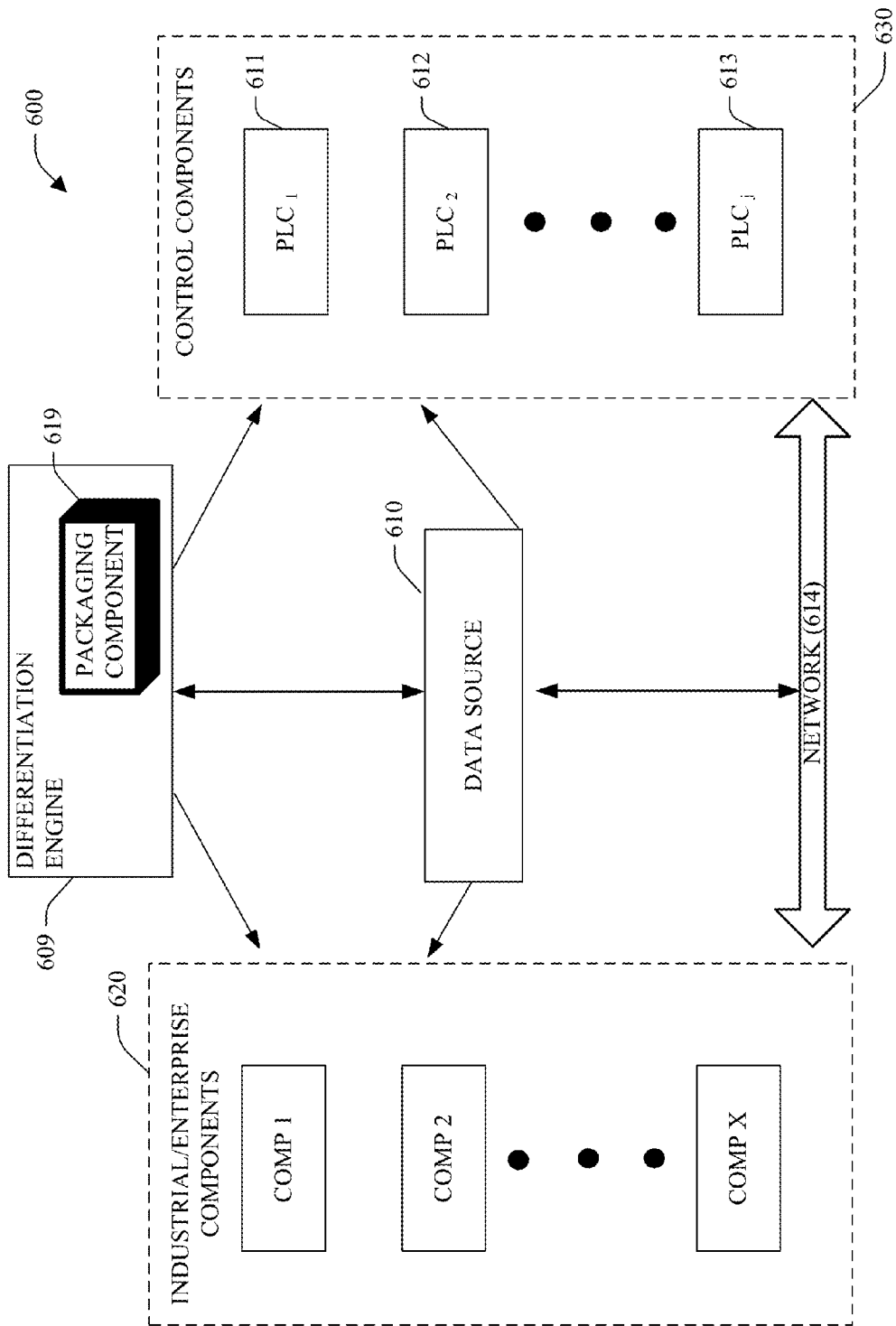
FIG. 6 illustrates a differentiation engine that further includes a packaging component, which facilitates audit recording and tracking of interactions in the industrial control system.

FIG. 6 illustrates a differentiation engine 609 that further includes a packaging component 619, which facilitates audit recording and tracking of interactions in the industrial control system 600. The packaging component 619 receives data from a data source 610, such as industrial unit associated with control components 611, 612, 613 (1 to J, where J is an integer.) Such received data can be encapsulated to expose properties and methods of such data, to rendering these properties and methods as data object(s), thus facilitating an object oriented presentation for an audit trail. Upon formatting the data as one or more data object(s), a data-consuming device within the industrial automation environment 600 can employ an interface to access a data object that a user desires to monitor.

The industrial setting or organizational enterprise 600 can employ a plurality of computers or network components that communicate across the network 614, to one or more industrial control components 630, such as for example programmable logic controllers (PLCs) 611, 612, 613 or other factory components.

The network 614 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 620 can include various computer or network components such as servers, clients, communications modules, mobile computers, wireless components, and the like which are capable of interacting across the network 614. Similarly, the term PLC as used herein can include functionality that can be shared across multiple components, systems, and/or networks 614. For example, one or more PLCs of the control component 630 can communicate and cooperate with various network devices across the network 614. Such can include substantially any type of control, communications module, computer, I/O device, sensor, Human Machine Interface (HMI)) that communicate via the network 614 which includes control, automation, and/or public networks. The PLC 630 can also communicate to and control various other devices such as Input/Output modules including Analog, Digital, Programmed/Intelligent I/O modules, other programmable controllers, communications modules, and the like.

The system 600 can further enable combining organizational information such as an organizational or hierarchical data model, which represents a common model of a plant that can be based in the S88 or S95 model, and is distributed among computers of the enterprise 620 and industrial controllers 630, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 600 can assign the upper levels of the hierarchy such as an Enterprise node and site to a computer system and the lower levels such as area, line, cell and machine can be contained in multiple industrial controllers 630; each of which can include components that are members of one or more organization units such as area or area model. Moreover, an organization unit can contain components from one or more controllers. The differentiation engine 609 can be positioned at various levels of the enterprise 620 and/or control 630; and can also further be integrated therein and scaled according to system data collection requirements. Such organizational model enables the differentiation 610 to locate data of interest for auditing purposes and to readily adapt and become integrated within the larger system 600.

Adaptability within the system 600 can be facilitated by data having additional information such as metadata that identifies the purpose of the data, and a granularity level that data associated therewith should be collected for. Such metadata can further be employed by the differentiation engine 609 to identify a version of a program that a particular object/run was modified therein. Moreover, the differentiation engine 609 can employ a trail of metadata to identify the versions and relevant data. Accordingly, one form of data can identify itself as a control tag that has been marked or labeled via metadata to indicate its significance for checking versions. Another type of label or metadata can indicate security information that is being distributed throughout the system 600.

Figure 7:
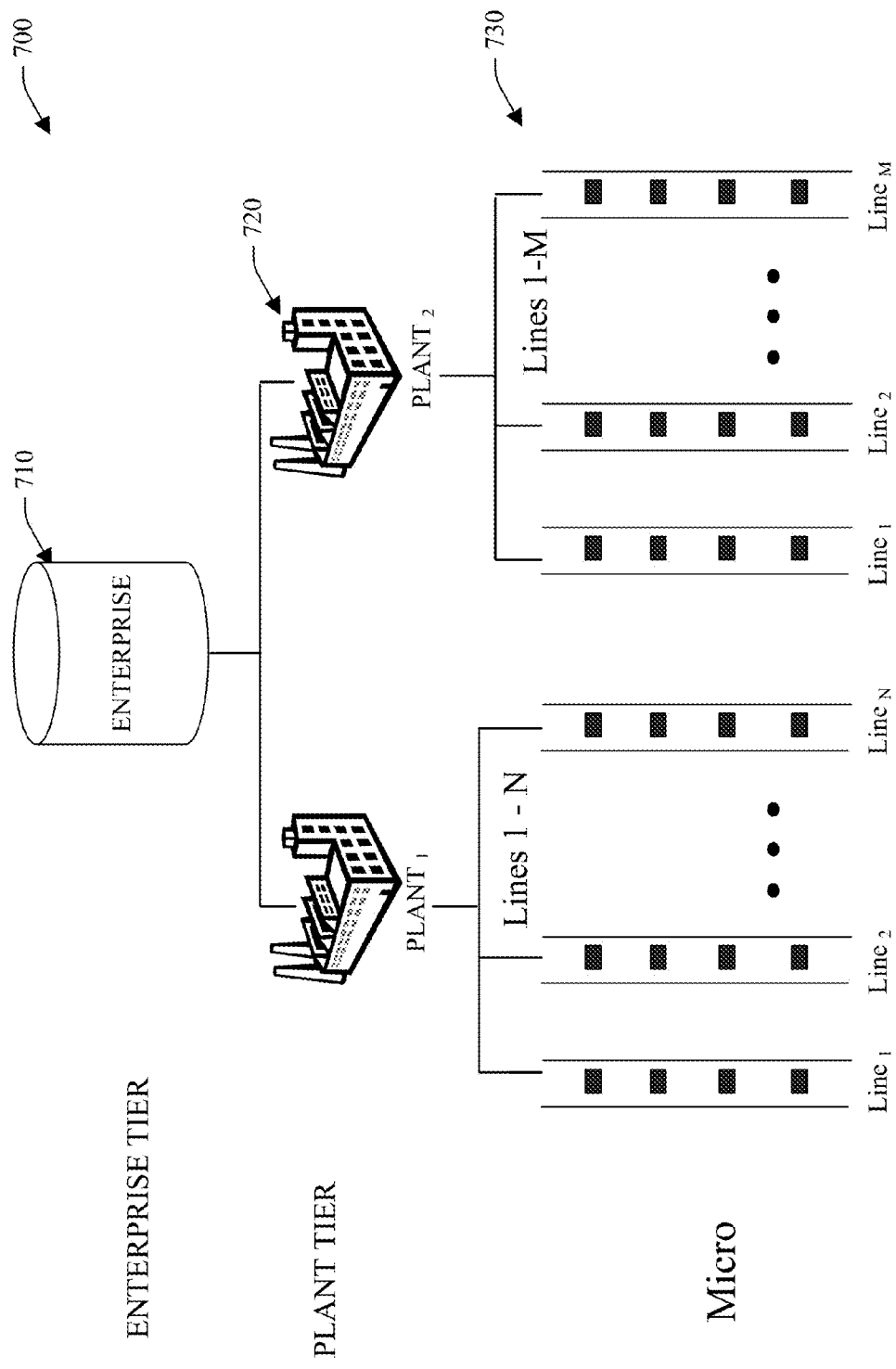
FIG. 7 illustrates an exemplary multi-tiered and distributed PLC system, which can employ a differentiation engine in accordance with an aspect of the subject innovation.

FIG. 7 illustrates an exemplary multi-tiered and distributed PLC system 700, which can employ a differentiation engine 700 in accordance with an aspect of the subject innovation. The exemplary system 700 illustrates three tiered PLC level, wherein the control tier can be referred to as the enterprise tier 710. This tier aggregates controls from lower level tiers such as from a plant tier 720 and a micro or embedded tier 730. As illustrated, the tiers 710 and 720 can include archival or permanent storage capabilities. In the system 700, data can be collected from two plants at the tier 720, and from a plurality of historian components at tier 730. It is to be appreciated that such an arrangement is exemplary in nature, and other arrangements are well within the realm of the subject innovation.

Typically, the system 700 can be viewed as a Distributed PLC environment that spans machines, plants, and enterprises. Accordingly, at level 730, the differentiation engine can supply an object oriented presentation of an audit trail for discrete data, alarms & events in a single archive if desired. Other aspects can include auto-discovery of data and context from controllers in local chassis including store/forward data capabilities from local buffers. Data can be collected without polling, having a low communications bandwidth. The plant level 720 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from PLCs located at level 730. Other features of the system 700 can include analysis components, logical units, components for interaction with report elements, embeddable presentation components, replication of configuration, storage, archiving, data compression, summarization/filtering, security, and scalability.

Figure 8:
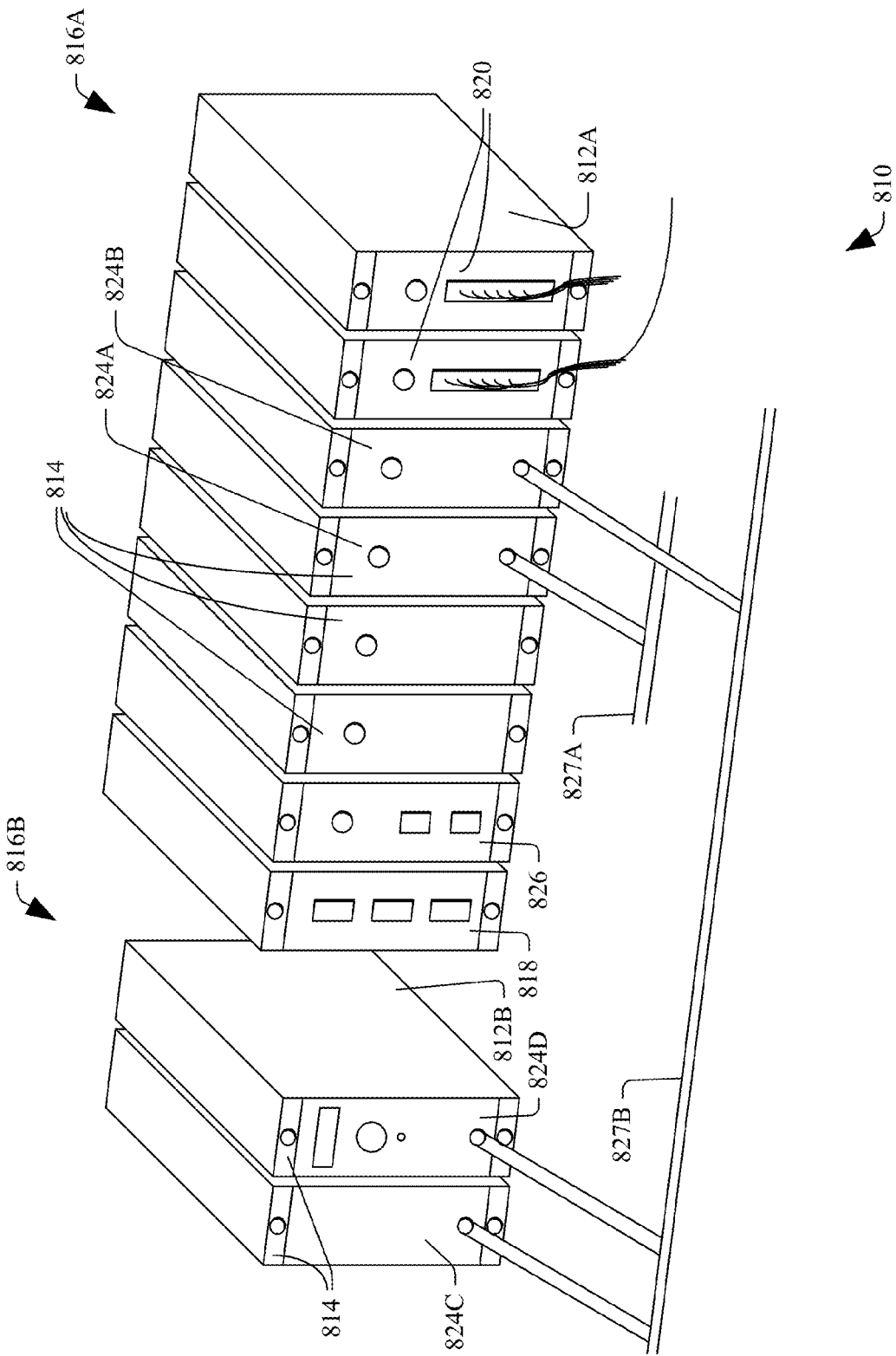
FIG. 8 illustrates an exemplary industrial automation network that employs a differentiation engine in accordance with an aspect of the subject innovation.

In order to provide context for the various applications in which the aspects of the innovation may be carried out, an exemplary control system is illustrated in FIG. 8, which can employ a differentiation engine that supplies an object oriented presentation of an audit trail. However, it will be appreciated that the various aspects of the innovation may be employed in association with controllers and control systems other than those illustrated and described herein. A distributed industrial control system 810 suitable for use with the subject innovation provides a first and second rack 812A and 812B for holding a number of functional modules 814 electrically interconnected by backplanes 816A and 816B running along the rear of the racks 812A and 812B respectively. Each module 814 may be individually removed from the rack 812A or 812B thereby disconnecting it from its respective backplane 816 for repair or replacement and to allow custom configuration of the distributed system 810.

The modules 814 within the rack 812A can include, for example, a power supply module 818, a processor module 826, two communication modules 824A and 824B and two I/O modules 820. A power supply module 818 receives an external source of power (not shown) and provides regulated voltages to the other modules 814 by means of conductors on the backplane 816A. The I/O modules 820 provide an interface between inputs from, and outputs to external equipment (not shown) via cabling 822 attached to the I/O modules 820 at terminals on their front panels. The I/O modules 820 convert input signals on the cables 822 into digital words for transmission on the backplane 816A. The I/O modules 820 also convert other digital words from the backplane 816A to the necessary signal levels for control of equipment.

The communication modules 824A and 824B provide a similar interface between the backplane 816A and one of two external high speed communication networks 827A and 827B. The high speed communication networks 827A and 827B may connect with other modules 814 or with remote racks of I/O modules 820, controller configuration tools or systems, or the like. In the example illustrated in FIG. 8, the high speed communication network 827A connects with backplane 816A via the communication module 824A, whereas the high speed communication network 827B connects the communication module 824B with communication modules 824C and 824D in rack 812B. The processor module 826 processes information provided by the communication modules 824A and 824B and the I/O modules 820 according to a stored control program or routine, and provides output information to the communication module 824 and the I/O modules 820 in response to that stored program and received input messages.

It is noted that as used in this application, terms such as "component," "engine", "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith.

What has been described above includes examples of the subject invention. Also, Appendix "A" is a paper in connection with particular aspects of the subject innovation, and such appendix is considered part of the detailed description of this application. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processors;
   one or more memory communicatively coupled to at least one of the one or more processors, the one or more memory having stored therein computer-executable instructions, comprising:
   a differentiation engine configured to generate an audit trail of logged real time interactions with an industrial control object, wherein the real time interactions comprise changes to the industrial control object in a plurality of versions of the industrial control object; and
   a view selection component configured to display a version of the industrial control object and to display changes between the version of the industrial control object and another version of the industrial control object.

2. The system of claim 1, wherein the logged real-time interactions further comprise at least one of an access date, an access time, an application attempting access, a user name, an online or offline status, an application start or stop time, a file invoked, opened, or saved by an application, a type of access, or a memory alteration.

3. The system of claim 1, wherein the differentiation engine is configured to be placed at various levels in a hierarchical model of an enterprise.

4. The system of claim 1, wherein the industrial control object one of a control device, a tag, a backing tag, a program, an equipment phase, or an I/O device.

5. The system of claim 1, wherein the differentiation engine is further configured to generate an audit report of the industrial control object based upon the changes.

6. The method of claim 1, wherein the industrial control object one of a control device, a tag, a backing tag, a program, an equipment phase, or an I/O device.

7. The method of claim 1, further comprising generating, by the device, an audit report of the industrial control object based upon the changes.

8. A method, comprising:
   generating recording, by a device including a processor, an audit trail of logged real time interactions with an industrial control object, wherein the real time interactions comprise changes to the industrial control object in a plurality of versions of the industrial control object; and
   displaying, by the device, a version of the industrial control object, and changes between the version of the industrial control object and another version of the industrial control object.

9. The method of claim 8, wherein the logged real-time interactions further comprise at least one of an access date, an access time, an application attempting access, a user name, an online or offline status, an application start or stop time, a file invoked, opened, or saved by an application, a type of access, or a memory alteration.

10. A non-transitory computer-readable medium having instructions stored thereon that, in response to execution, cause at least one device to perform operations comprising:
    recording changes to an industrial control object in a plurality of versions of the industrial control object, and
    displaying a version of the industrial control object, and changes between the version of the industrial control object and another version of the industrial control object.

11. The non-transitory computer-readable medium of claim 10, wherein the logged real-time interactions further comprise at least one of an access date, an access time, an application attempting access, a user name, an online or offline status, an application start or stop time, a file invoked, opened, or saved by an application, a type of access, or a memory alteration.

12. The non-transitory computer-readable medium of claim 10, wherein the industrial control object one of a control device, a tag, a backing tag, a program, an equipment phase, or an I/O device.

13. The non-transitory computer-readable medium of claim 10, further comprising generating an audit report of the industrial control object based upon the changes.

14. The non-transitory computer-readable medium of claim 10, further comprising logging the real time interactions with the industrial control object at a specified level in a hierarchical model of an enterprise.

* * * * *